United States Patent
George et al.

(10) Patent No.: US 7,509,312 B2
(45) Date of Patent: Mar. 24, 2009

(54) METHOD AND APPARATUS FOR MANAGING PEER-TO-PEER SEARCH RESULTS

(75) Inventors: David A. George, Somers, NY (US); Raymond B. Jennings, III, Ossining, NY (US); Martin G. Kienzle, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/495,790

(22) Filed: Jul. 28, 2006

(65) Prior Publication Data

US 2008/0027923 A1    Jan. 31, 2008

(51) Int. Cl.
*G06F 17/30* (2006.01)
*G06F 15/173* (2006.01)

(52) U.S. Cl. .............. 707/4; 707/2; 707/3; 707/5; 709/238

(58) Field of Classification Search .............. 707/2–5; 709/238
See application file for complete search history.

(56) References Cited

U.S. PATENT DOCUMENTS

| | | | |
|---|---|---|---|
| 7,117,201 B2 | 10/2006 | Kuno et al. | |
| 7,362,979 B2 | 4/2008 | Gill et al. | |
| 7,376,749 B2 * | 5/2008 | Loach et al. | 709/238 |
| 2002/0156756 A1 | 10/2002 | Stanley et al. | |
| 2004/0117376 A1 | 6/2004 | Lavin et al. | |
| 2004/0133571 A1 | 7/2004 | Horne et al. | |
| 2004/0181607 A1 | 9/2004 | Xu et al. | |
| 2004/0230571 A1 | 11/2004 | Robertson | |
| 2005/0091167 A1 | 4/2005 | Moore et al. | |
| 2005/0108368 A1 * | 5/2005 | Mohan et al. | 709/220 |
| 2005/0267945 A1 | 12/2005 | Cohen et al. | |
| 2006/0041560 A1 | 2/2006 | Forman et al. | |

* cited by examiner

*Primary Examiner*—Apu M Mofiz
*Assistant Examiner*—Cindy Nguyen

(57) ABSTRACT

One embodiment of the present method and apparatus for processing a search request message received over a network includes computing a threshold value in accordance with the search request message and returning at least one search result to a user in response to the search request message, if a rank of the at least one search result at least meets the threshold value.

1 Claim, 4 Drawing Sheets

| MAX RESULTS 302 | RESULTS RANK 304 | RESULTS COUNT 308 |
| --- | --- | --- |
| | HOPS 306 | TIME TO LIVE 310 |

FIG. 3

METHOD AND APPARATUS FOR MANAGING PEER-TO-PEER SEARCH RESULTS

FIELD OF THE INVENTION

The present invention relates generally to computing networks and relates more particularly to managing search results in peer-to-peer data transfer networks.

BACKGROUND

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate nodes 111. The requesting node 101 then requests the relevant data from a responding node 103 by connecting directly to the responding node 103, e.g., via direct connection 109.

Searches such as that described, while helpful in locating content for which a user is searching, often tend to flood the network with redundant and/or irrelevant data. For example, if an initial search does not produce the desired responses, the time to live (TTL) of the search message may be increased, and the search re-issued. The repeated searches are sent to the same initial nodes to which the initial search was sent; accordingly, many of the results received by the requesting node are duplicates. Network traffic is thus unnecessarily increased, while the results may be no better than those produced by the initial search. Some P2P networks attempt to reduce traffic by limiting the number of search results; however, this may prevent results that better match the search request from reaching the requesting node.

Thus, there is a need in the art for a method and apparatus for managing peer-to-peer search results.

SUMMARY OF THE INVENTION

One embodiment of the present method and apparatus for processing a search request message received over a network includes computing a threshold value in accordance with the search request message and returning at least one search result to a user in response to the search request message, if a rank of the at least one search result at least meets the threshold value.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a schematic diagram illustrating one embodiment of a search request message, according to the present invention.

To facilitate understanding, identical reference numerals have been used, where possible, to designate identical elements that are common to the figures.

DETAILED DESCRIPTION

In one embodiment, the present invention is a method and apparatus for managing peer-to-peer search results. Embodiments of the present invention allow a requesting node to manage both the quality and the quantity of the results that are returned in response to a search request message sent in a P2P network. By combining these abilities to both limit the number of search results and control the quality of the search results, fewer, better results can be returned while generating less network traffic.

Figure 1:
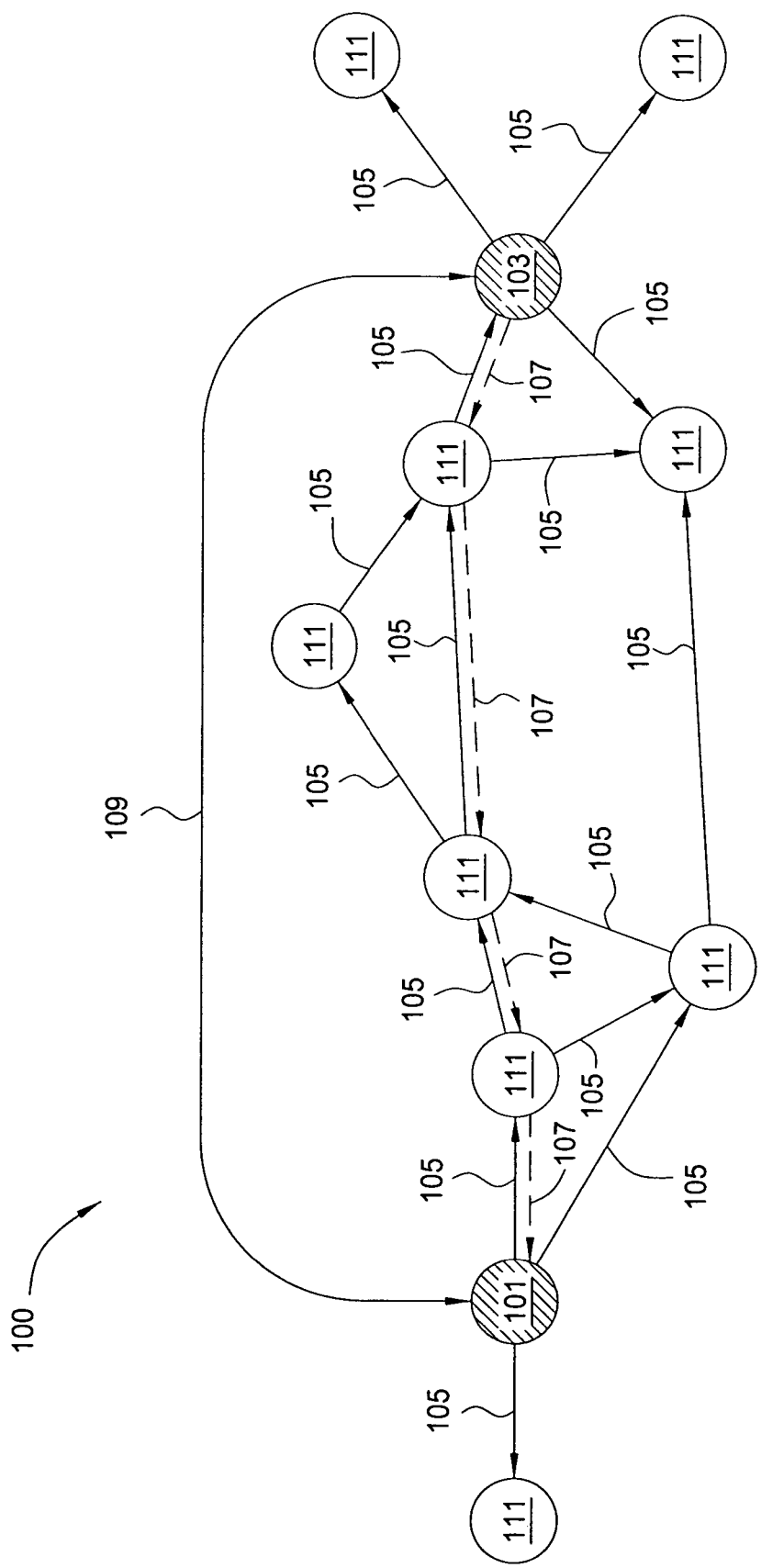
FIG. 1 is a schematic diagram of a network of nodes interacting in a peer-to-peer manner.
Figure 2:
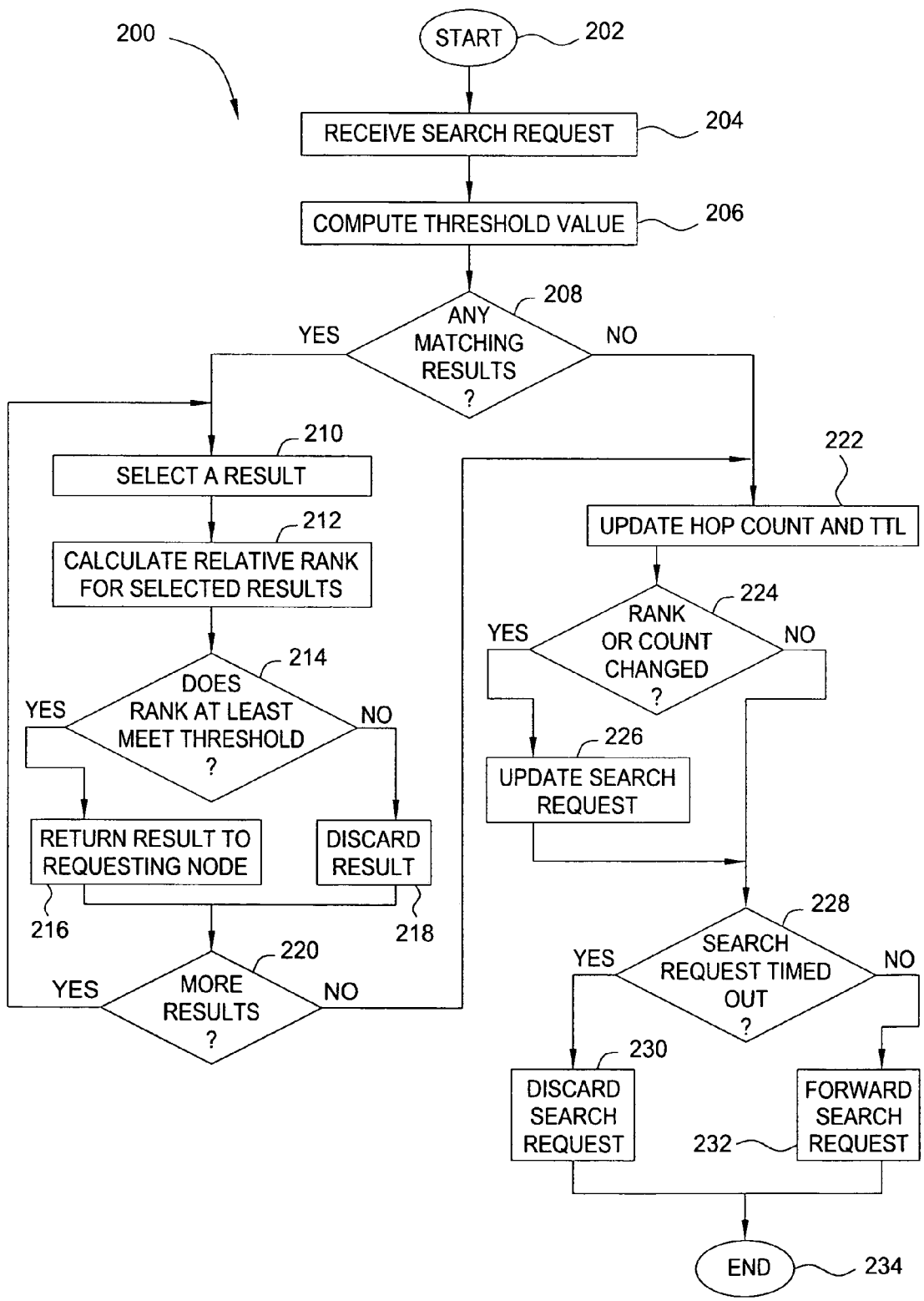
FIG. 2 is a flow diagram illustrating one embodiment of a method for processing search request messages, according to the present invention.

FIG. 2 is a flow diagram illustrating one embodiment of a method 200 for processing search request messages, according to the present invention. The method 200 may be executed, for example, at a node in a P2P network that receives search request messages from its neighbors.

The method 200 is initialized at step 202 and proceeds to step 204, where the method 200 receives a search request message. The search request message is received from a neighbor node, who may be the requesting node (i.e., the node at which the search request message originated) or an intermediate node on the path from the requesting node to the receiver.

FIG. 3 is a schematic diagram illustrating one embodiment of a search request message 300 that may be received in accordance with step 204. As illustrated, the search request message 300 comprises a plurality of fields: a results rank field 304, a results count field 308, a maximum results field 302, a hop count field 306 and a time to live (TTL) field 310. The results rank field 304, as described in further detail below, indicates a threshold that should be met by any search results returned to the requesting node. The results count field 308 indicates a number of search results returned to the requesting node on the given path within the network. The maximum results field 302 indicates a maximum number of search results that can be returned to the requesting node on the given path. The hop count field 306 indicates how many hops the search request message 300 has traveled in the network. The TTL field 310 indicates how many more hops the search request message 300 may travel before expiring. In one embodiment, initial values for any fields of the search request message 300 are selectable by the requesting node. In another embodiment, a default value for one or more fields of the search request message 300 is zero.

Referring back to FIG. 2, in step 206, the method 200 computes a threshold value. This threshold value dictates a desired characteristic of the search results to be returned. In one embodiment, the desired characteristic relates to at least one of the characteristics defined in the fields of the search request message 300 illustrated in FIG. 3. For example, the threshold value may define a minimum desired quality of the search results, where the minimum desired quality is the value specified in the results rank field 304. As another example, the threshold value may comprise a weighted value that accounts for both of the values in the results rank field 304 and the TTL field 310. In this case, a high TTL field value (i.e., indicating a relatively new search request message in the network) indicates that the results rank field value is the primary deciding factor (i.e., accorded greater weight). As the TTL field value decreases (i.e., the search request message is closer to expiring), the results rank field value will be accorded less weight.

Thus, for example, consider a weighted threshold value, where:

$$\text{Weighted threshold} = \text{results rank field value} - \frac{\text{maximum } TTL \text{ value}}{\text{current } TTL \text{ value} + 1} + 1 \quad \text{(EQN. 1)}$$

An exemplary results rank field value for a new search request message might be 50, while an exemplary maximum TTL value is 8. Thus, as the search request message propagates through the network, each receiving node will calculate one Weighted threshold value at step 206. In this case, the first node calculates a Weighted threshold=(50)−(8/(7+1))+1=50; the second node calculates a Weighted threshold=(50)−(8/(6+1))+1=49.86; the third node calculates a Weighted threshold= (50)−(8/(5+1)) +1=49.67, and so on, until the last node calculates a Weighted threshold=(50)−(8/(0+1))+1=43. In a further example, the weighted threshold could account for the value in the results count field 308, such that as the number of returned results increases, the threshold value is closer to the value in the results rank field 304. If the results count field value is lower, the threshold value could be lower than the results rank field value. Those skilled in the art will appreciate that numerous other combinations of the fields in the search request message 300 may be weighted to produce a threshold value, depending on the nature of the desired search results.

In step 208, the method 200 determines whether any locally available results can potentially satisfy the search request. If the method 200 concludes in step 208 that there are no local results that may satisfy the search request, the method 200 proceeds to step 222 and updates the search request message, as described in greater detail below.

Alternatively, if the method 200 concludes in step 208 that there is at least one local result that may satisfy the search request, the method 200 proceeds to step 210 and selects one of the identified search results.

In step 212, the method 200 calculates a relative rank of the selected search result. In one embodiment, the relative rank of a search result is determined by a number or percentage of words or data in the search result that is matched to the search request. In another embodiment, the relative rank of a search result is a weighted value that accounts for at least one of the characteristics tracked in the fields of the search request message 300 of FIG. 3.

In step 214, the method 200 determines whether the rank of the search result calculated in step 212 meets or exceeds the threshold value computed in step 206. A simplest, unweighted case would be where the threshold value is simply the value in the search request message's results rank field. In this case, the calculated rank of a search result would need to at least meet the value in the results rank field of the search request message. In the exemplary weighted case discussed above with respect to step 206, it can be appreciated that the threshold value that must be met by a search result decreases as the search request message propagates through the network.

If the method 200 concludes in step 214 that the rank of the search result does not meet or exceed the threshold value, the method 200 proceeds to step 218 and discards the search result. Alternatively, if the method 200 concludes in step 214 that the rank of the search result does meet or exceed the threshold value, the method 200 proceeds to step 216 and returns the search result to the requesting node.

Once the search result has been discarded (i.e., in accordance with step 218) or returned to the requesting node (i.e., in accordance with step 216), the method 200 proceeds to step 220 and determines whether there are any remaining potential search results to be considered. If the method 200 concludes in step 220 that there are still potential search results to be considered, the method 200 returns to step 210 and proceeds as described above to select a next potential search result.

Alternatively, if the method 200 concludes in step 220 that there are no more potential search results to be considered, the method 200 proceeds to step 222 and updates the search request message. Specifically, in step 222, the method 200 updates the hop count and time to live (TTL) fields of the search request message (i.e., fields 306 and 310 in FIG. 3). The hop count field is incremented (e.g., by one), while the TTL field is decremented (e.g., also by one).

In step 224, the method 200 determines whether the results rank and results count fields that track the ranks and number of returned search results (i.e., fields 304 and 308 in FIG. 3) should be updated, i.e., due to the method 200 forwarding one or more search results on to the requesting node (i.e., in step 216). If the method 200 concludes in step 224 that the results rank and results count fields should be updated, the method 200 proceeds to step 226 and updates the search request message. In one embodiment, the results rank field is updated to reflect the rank of the highest-ranked returned search result, including any search results just returned by the method 200. In one embodiment, the results count field is updated to reflect the total number of search results returned to the requesting node on the given path within the network, including those just returned by the method 200.

In step 228, the method 200 determines whether the search request message has timed out. In one embodiment, this determination is made based on the values in one or more of the following fields of the search request message: the results count field, the maximum results field, the hop count field and the TTL field. For example, the TTL field of the search request message may have expired, or the maximum results field may indicate that a maximum allowable number of results have been returned to the requesting node. If the method 200 concludes in step 228 that the search request message has timed out, the method 200 proceeds to step 230 and discards the search request message. Alternatively, if the method 200 concludes in step 228 that the search request message has not timed out, the method 200 proceeds to step 232 and forwards the search request message on to one or more neighboring nodes in accordance with standard P2P protocol.

Once the search request message has been either discarded (i.e., in accordance with step 230) or forwarded (i.e., in accordance with step 232), the method 200 terminates in step 234.

The method 200 thereby allows a requesting node to manage both the quality and the quantity of the results that are returned in response to a search request message sent in a P2P network. For example, by requiring returned results to meet at least a minimum threshold of quality (i.e., by relatively ranking the results), the chances of relevant results being returned are increased, while the chances of receiving redundant and/or inferior results are decreased. That is, if a search result identified by a potential responding node is not at least as good (e.g., relevant) as a search result that has already been returned by a prior node, the potential responding node will not respond. Moreover, the method 200 allows the requesting node to limit the number of search results that are allowed in response to a search request message. By combining these abilities to both limit the number of search results and control the quality of the search results, fewer, better results are returned while generating less network traffic.

Because many copies of a given search request message may go out simultaneously over many different paths in the network, the different fields of each search request message may vary in their respective values. For example, the results rank filed of a first copy of a search request message may reflect a greater value than the corresponding field of a second copy of the search request message sent over a different path. Thus, the results returned over different paths within the network may vary.

Moreover, in some embodiments, one or more fields of the search request message may be omitted, and any decisions made by other nodes within the network (e.g., as far as whether to return a given search result) may be based on the values in the fields that are not omitted.

Figure 4:
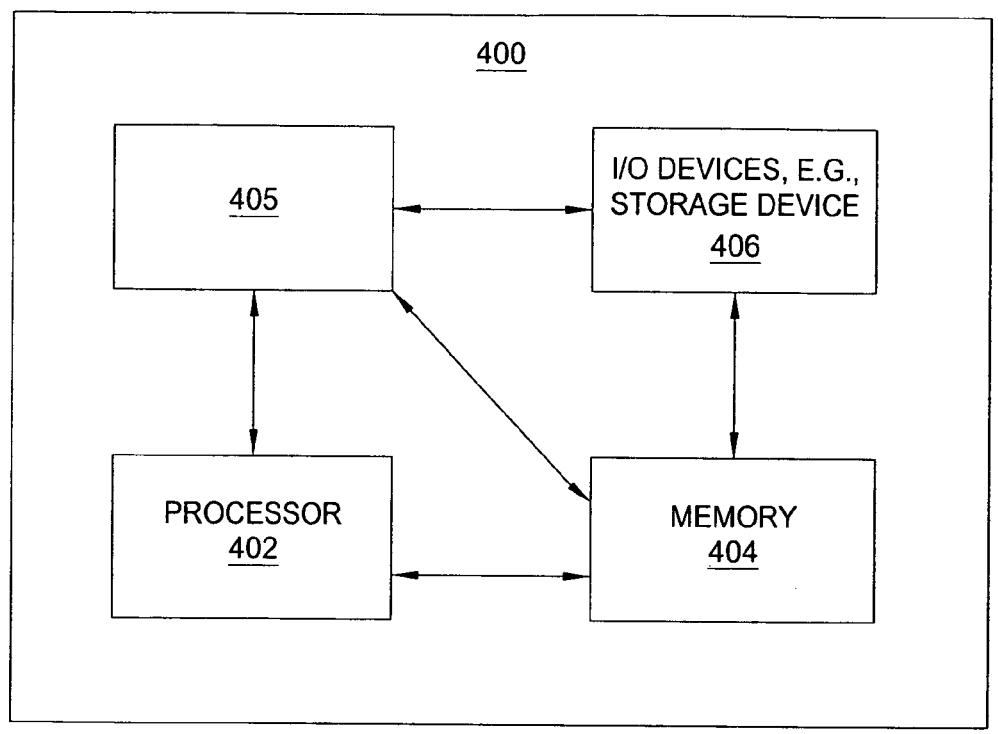
FIG. 4 is a high level block diagram of the resource access method that is implemented using a general purpose computing device.

FIG. 4 is a high level block diagram of the search management method that is implemented using a general purpose computing device 400. In one embodiment, a general purpose computing device 400 includes a processor 402, a memory 404, a search management module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the search management module 405 can be implemented as a physical device or subsystem that is coupled to a processor through a communication channel.

Alternatively, the search management module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the search management module 405 for managing search results received over a P2P network described herein with reference to the preceding Figures can be stored on a computer readable medium or carrier (e.g., RAM, magnetic or optical drive or diskette, and the like).

Thus, the present invention represents a significant advancement in the field of computer networks. A method and apparatus are provided that enable a user to manage both the quality and the quantity of the results that are returned in response to a search request message sent in a P2P network. By combining these abilities to both limit the number of search results and control the quality of the search results, fewer, better results can be returned while generating less network traffic.

While the foregoing is directed to the preferred embodiment of the present invention, other and further embodiments of the invention may be devised without departing from the basic scope thereof, and the scope thereof is determined by the claims that follow.

The invention claimed is:

1. A method for processing a search request message received over a network, the method comprising:
   computing a threshold value in accordance with one or more values in one or more fields of the search request message, wherein said one or more fields include: a result rank field, a results count field, or a time to live field, wherein said computing comprises:
   increasing a value in said time to live field of the search request message by one to generate a first value;
   dividing a maximum time to live of the search request message by the first value to obtain a second value;
   subtracting the second value from a value in said result rank field of the search request message to generate a third value; and
   increasing the third value by one to produce the threshold value;
   returning at least one search result to a user in response to the search request message, if a rank of the at least one search result at least meets the threshold value; and
   incrementing a value in said results count field of the search request message by a value equal to a number of search results returned to the user in response to the search request message.

* * * * *